PREFERENCE CIRCUIT EMPLOYING MAGNETIC ELEMENTS
Original Filed Feb. 4, 1960
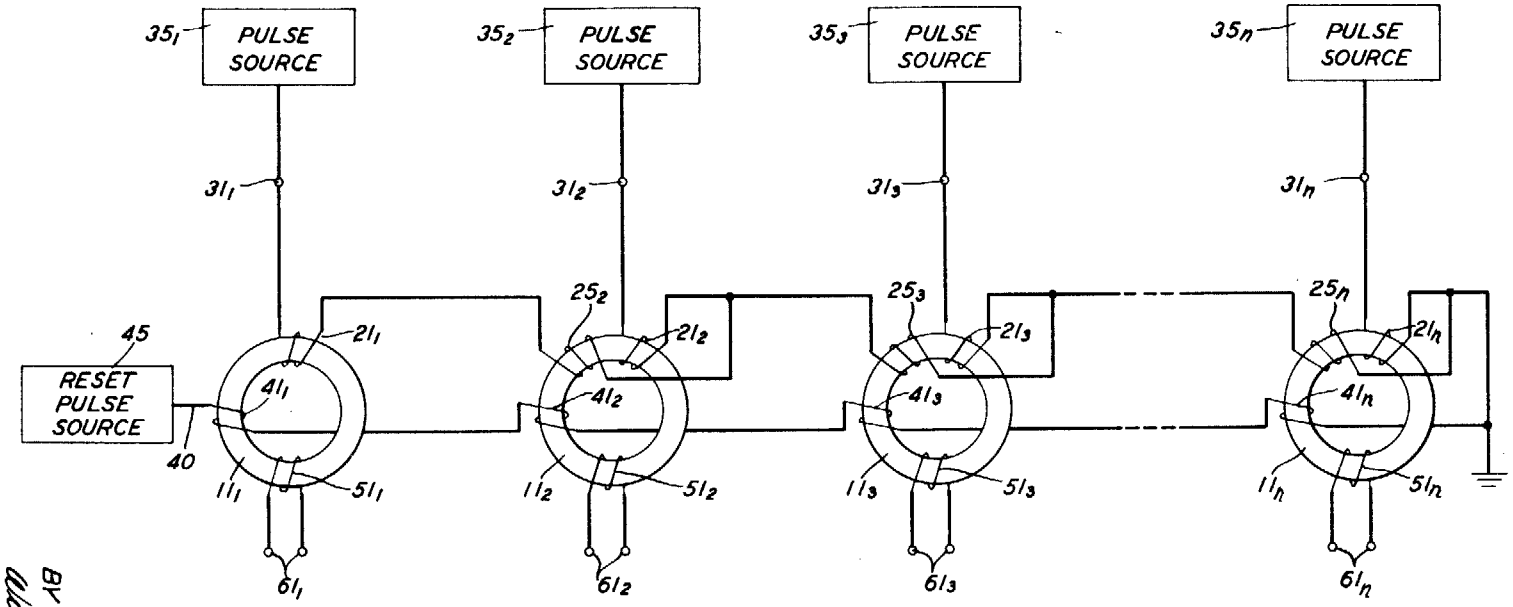
INVENTOR
J. A. BALDWIN, JR.
BY William H. Kamstra
ATTORNEY United States Patent Office Re. 26,572
Reissued Apr. 29, 1969

26,572
PREFERENCE CIRCUIT EMPLOYING MAGNETIC ELEMENTS

John A. Baldwin, Jr., Santa Barbara, Calif., assignor to Bell Telephone Laboratories, Incorporated, New York, N.Y., a corporation of New York Original No. 3,233,112, dated Feb. 1, 1966, Ser. No. 6,825, Feb. 4, 1960. Application for reissue Oct. 27, 1966, Ser. No. 596,037
Int. Cl. G06f 7/06
U.S. Cl. 340—172.5 8 Claims

Matter enclosed in heavy brackets [ ] appears in the original patent but forms no part of this reissue specification; matter printed in italics indicates the additions made by reissue.

ABSTRACT OF THE DISCLOSURE

*The first of a series of input signals is determined in a predetermined order by applying the input signals to set windings of respective magnetic cores and coupling a common inhibit winding to each core such that the first set core inhibits the lower order cores from generating an output when the cores are reset, only the first set core thus providing an output signal.*

This invention relates to electrical circuits adapted to perform preference operations and more particularly to such circuits in which magnetic cores are employed as switching elements.

In the information handling art it is sometimes required to determine which one of an ordered sequence of terminals is the first one of the sequence to have an electrical signal applied thereon. Thus, if signals are applied to all or some of the terminals during the operation of a system in which the terminals are found, it is required that the lowest numbered one of the terminals to which a signal is applied be determined.

Accordingly, it is an object of this invention to ascertain that particular one of an ordered sequence of terminals which is the lowest numbered one of said sequence having an electrical signal thereon.

It is another object of this invention to provide a sequential circuit capable of manifesting a preference between a plurality of input signals.

It is a further object of this invention to provide a new and improved magnetic core circuit.

The foregoing and other objects of this invention are realized in one specific illustrative embodiment thereof utilizing a plurality of toroidal magnetic cores having substantially rectangular hysteresis characteristics. The cores are associated with respective ones of a sequence of terminals by input windings connected thereto and coupled to the cores. Additionally, the input winding of each core is serially connected to inhibit windings coupled to the remaining cores of the sequence. As a result, an input signal from any one of the terminals will magnetically set the associated core but will at the same time prevent any of the succeeding cores of the sequence from being set by signals appearing on any of the succeeding terminals of the sequence. Furthermore, output windings and serially connected reset windings are inductively coupled to the cores. Thus, if all of the cores are initially in a reset magnetic condition, a subsequent application of simultaneous input signals from some or all of the terminals will switch one core to the set condition. The core switched will be the core associated with the lowest numbered one of the terminals having a signal thereon. The signal from this terminal is also applied to the inhibit windings of all of the cores subsequent to the switching core, thereby preventing the switching of any subsequent core regardless of the presence or absence of signals on the input windings of these subsequent cores. A subsequent signal applied to the reset windings will then cause the switched core to switch back to a reset condition. The determination of the lowest numbered terminal having a signal thereon during an input phase can accordingly be made by detecting the signal appearing on the output winding of the switching core responsive to the setting or the resetting of the core.

Accordingly, it is a feature of this invention that an input winding inductively coupled to any one of a sequence of magnetic elements is serially connected to an inhibit winding of all subsequent cores.

This invention, together with the foregoing and other objects and features thereof, will be better understood from a consideration of the detailed description of an illustrative embodiment thereof which follows when taken in conjunction with the accompanying drawing the single figure of which depicts a specific magnetic core circuit according to the principles of this invention.

The drawing depicts toroidal magnetic cores $\mathbf{11}_1$ through $\mathbf{11}_n$ each of which advantageously has a substantially rectangular hysteresis characteristic. The cores can therefore manifest either of two conditions of remanent magnetization, one of which will be considered a set condition and the other a reset condition. Input windings $\mathbf{21}_1$ through $\mathbf{21}_n$ are inductively coupled to the cores $\mathbf{11}_1$ through $\mathbf{11}_n$, respectively, and inhibit windings $\mathbf{25}_2$ through $\mathbf{25}_n$ are inductively coupled to the cores $\mathbf{11}_2$ through $\mathbf{11}_n$, respectively. The input windings $\mathbf{21}_1$ through $\mathbf{21}_n$ are connected at one end to input terminals $\mathbf{31}_1$ through $\mathbf{31}_n$, respectively, while the inhibit windings $\mathbf{25}_2$ through $\mathbf{25}_n$ are serially connected between the input winding $\mathbf{21}_1$ and ground. The input windings $\mathbf{21}_2$, $\mathbf{21}_3$ and $\mathbf{21}_n$ have their other ends connected between the inhibit windings $\mathbf{25}_2$ and $\mathbf{25}_3$, between the inhibit winding $\mathbf{25}_3$ and the immediately following inhibit winding, and to ground, respectively. Reset windings $\mathbf{41}_1$ through $\mathbf{41}_n$ are also inductively coupled to the cores $\mathbf{11}_1$ through $\mathbf{11}_n$, respectively, and are serially connected by the circuit 40 between a source of reset pulses 45 and ground. Output windings $\mathbf{51}_1$ through $\mathbf{51}_n$ are likewise inductively coupled to the cores $\mathbf{11}_1$ through $\mathbf{11}_n$, respectively, and present output terminals $\mathbf{61}_1$ through $\mathbf{61}_n$, respectively. Additionally, the input terminals $\mathbf{31}_1$ through $\mathbf{31}_n$ have connected thereto the pulse sources $\mathbf{35}_1$ through $\mathbf{35}_n$, respectively, the operational sequence of which sources is to be determined. The input pulse sources 35 may comprise any circuits well known in the art which provide pulses for use in information handling and data processing systems generally. Reset pulse source 45 may comprise any circuit well known in the art capable of providing pulses of the character to be hereinafter described and is accordingly shown only in block diagram form.

Bearing in mind the foregoing organization of the depicted embodiment of a circuit according to the principles of this invention, a detailed description of illustrative operations of the circuit will now be set forth. Initially, a positive pulse from the reset pulse source 45 generates, by means of the reset windings 41, a reset remanent flux condition in each of the cores 11. Subsequent to the resetting operation, positive pulses from the input pulse sources 35 may be selectively and simultaneously applied to one or more of the input terminals $\mathbf{31}_1$ through $\mathbf{31}_n$. The sense of the input windings $\mathbf{21}_1$ through $\mathbf{21}_n$ is such that positive pulses applied thereto tend to switch the cores associated with these windings to a set magnetic flux condition while the sense of the inhibit windings $\mathbf{25}_2$ through $\mathbf{25}_n$ is such that positive pulses applied thereto tend to maintain the cores associated with these windings in their reset magnetic flux condition. Additionally, the inhibit windings have a number of turns equal to or greater than the number of turns of the input windings.

The first illustrative operation which will be described is one in which positive pulses are applied to all of the input terminals $31_1$ through $31_n$ by the input pulse sources 35. The signal applied to the terminal $31_1$ is transmitted through the input winding $21_1$ and inhibit windings $25_2$ through $25_n$ to ground; the signal applied to the terminal $31_2$ is transmitted through the input winding $21_2$ and inhibit windings $25_3$ through $25_n$ to ground; the signal applied to the terminal $31_3$ is transmitted through the input winding $21_3$ and subsequent inhibit windings including the inhibit winding $25_n$ to ground; while the signal applied to the terminal $31_n$ is transmitted through the input winding $21_n$ alone to ground. The signal on the input winding $21_1$ causes the core $11_1$ to switch to a set magnetic condition. The signals on the inhibit windings $25_2$ through $25_n$ prevent the switching of the cores $11_2$ through $11_n$, respectively, despite the presence of signals on the input windings $21_2$ through $21_n$. Thus core $11_1$ is the only core which switches in response to the application of signals to all of the input terminals $31_1$ through $31_n$. A subsequent pulse from the reset pulse source 45 again switches the core $11_1$ to the reset condition and readies the circuit for the next input phase of operation. A signal is induced on the output terminals $61_1$ responsive to the resetting of the core $11_1$, and the presence of this signal on the output terminals $61_1$ is available as an indication that terminal $31_1$ was the lowest numbered one of the sequence of input terminals $31_1$ through $31_n$ to have had a signal thereon during a phase of operation of the system in which the terminals are found and of which the present invention may advantageously comprise a part.

In another illustrative operation to be described, positive pulses are applied to the terminals $31_2$ and $31_n$ by the input pulse sources $35_2$ and $35_n$. The signal applied to the terminal $31_2$ is again transmitted through input winding $21_2$ and inhibit windings $25_3$ through $25_n$ to ground, and the signal applied to the terminal $31_n$ is again transmitted through input winding $21_n$ alone to ground. The signal on input winding $21_2$ causes the core $11_2$ to switch to a set magnetic condition, while the signal on the inhibit winding $25_n$ prevents the switching of core $11_n$ despite the presence of a signal on the input winding $21_n$. A subsequent pulse from the reset pulse source 45 switches core $11_2$ back to the reset magnetic condition. A signal is induced as a result in the output winding $51_2$ responsive to the switching of the core $11_2$, and the presence of this signal on terminals $61_2$ may be used as an indication that terminal $31_2$ was the lowest numbered one of the input terminals $31_1$ through $31_n$ which had a signal thereon during the previous input phase of operation.

Thus it can be seen that the signal applied to the lowest numbered one of the input terminals $31_1$ through $31_n$ causes a current to flow in subsequent ones of the inhibit windings $25_2$ through $25_n$ thereby preventing the switching of all but one of the cores $11_1$ through $11_n$ responsive to signals appearing on the input windings $21_1$ through $21_n$. Since only one core switches during the input phase of operation, only that one core is switched during the subsequent reset phase of operation and only the output winding coupled to that core has a signal induced thereon by the switching of the core. The detection of that one of the output windings which has a signal induced thereon will therefore serve to identify that one of the input terminals which was the lowest numbered one of the sequence of terminals having a signal thereon during the previous input phase of operation.

What has been described is considered to be only one illustrative embodiment of the present invention. Other embodiments may be envisioned by one skilled in the art, for example, in which the switching elements comprise multi-apertured magnetic structures or magnetic memory wires. Various and numerous other arrangements may thus be devised by one skilled in the art without departing from the spirit and scope of this invention.

What is claimed is:

1. An electrical circuit comprising a first, second, and third magnetic core, each of said cores having a substantially rectangular hysteresis characteristic, a reset winding, an input winding, and an inhibit winding inductively coupled to each of said cores, said inhibit windings of said second and third cores and said input winding of said first core being serially connected, and said input winding of said second core being serially connected to said inhibit winding of only said third core, means for selectively applying input current pulses to said input windings, means for applying a reset current pulse to each of said reset windings, and an output winding on each of said cores.

2. An electrical circuit comprising a sequence of at elast three magnetic cores, each having substantially rectangular hysteresis characteristics, an input, an output, and a reset winding on each of said cores, an inhibit winding on all but the first core of said sequence of cores, circuit means including a reset pulse source for connecting each of said reset windings in series, circuit means for connecting the input winding of each core except the last core of said sequence of cores in series with the inhibit winding of each of the succeeding cores only of said sequence of cores, and means for selectively applying input current pulses to said input windings.

3. An electrical circuit comprising a plurality of at least three magnetic cores arranged in a numbered sequence, each of said cores having substantially rectangular hysteresis characteristics, an input, a reset, and an output winding on each of said cores, each of said input windings being serially connected to an inhibit circuit including an inhibit winding on each of the succeeding cores only of said sequence, means for selectively applying input pulses to said input windings, and means for subsequently applying a reset pulse to each of said reset windings.

4. An electrical preference circuit comprising a plurality of at least three magnetic elements arranged in an ordered sequence, each of said elements having substantially rectangular hysteresis characteristics, an input winding coupled to each of said elements, means for applying an input signal to the input winding of one element of said ordered sequence to set said one element to one magnetic state, means for preventing higher numbered elements of said sequence than said one element from being set to said one magnetic state comprising an inhibit winding coupled to each of said higher numbered elements connected in series with the input winding of said one element only, means including a reset winding on each of said elements for subsequently resetting said one element to a second magnetic state, and an output winding on said last-mentioned element energized responsive to said resetting for generating an output signal.

5. An electrical circuit comprising a sequence of at least three magnetic elements having substantially rectangular hysteresis characteristics, each of said elements having an input winding and an inhibit winding inductively coupled thereto, reset means for driving each of said elements to a first condition of remanent magnetization, input means for selectively applying input signals to said input windings, circuit means for connecting the input winding of each element with the inhibit windings of all succeeding elements only of said sequence of elements, and output means for detecting which of said elements are switched to a second condition of remanent magnetization by said input signals.

6. An electrical circuit comprising a sequence of at least three magnetic elements having substantially rectangular hysteresis characteristics, each of said elements having an input, an output, and a reset winding inductively coupled thereto, each of said elements except the first one of said elements also having an inhibit winding inductively coupled thereto, circuit means for connecting the input winding of each element with the inhibit windings of all succeeding elements only of said sequence of elements, and means for selectively applying input current pulses to said input windings.

7. An electrical circuit comprising a succession of a first, a second, and a third magnetic core, each having substantially rectangular hysteresis characteristics, an input, a reset, an inhibit, and an output winding on each of said cores, the input winding of said first core being connected in series opposing with the inhibit windings of said second and third core, means for applying a first input current pulse to the input winding of a first one of said cores to set said last-mentioned core and prevent each of the succeeding cores of said succession from setting, means for applying a second input current pulse to the input winding of one of said succeeding cores to set said last-mentioned core only when said first input pulse is not applied concurrently with said second input pulse, the inhibit winding of each of said cores being electrically isolated from the input windings of the preceding cores of said succession of cores so that none of said second input current pulse passes through said inhibit windings of said preceding cores, and means for subsequently applying a reset current pulse to said reset windings to reset said first one of said cores to induce an output signal in the output winding of said last-mentioned core.

*8. A ranking apparatus comprising a plurality of elements for indicating the highest order one of a plurality of circuit responses according to a predetermined order, and means interconnecting said elements for directing a signal only to each lower order element to inhibit each said lower order element so that the highest order circuit response according to said predetermined order is the only one indicated.*

References Cited

The following references, cited by the Examiner, are of record in the patented file of this patent or the original patent.

UNITED STATES PATENTS

| | | | |
|---|---|---|---|
| 2,719,733 | 10/1955 | Karnaugh | 307—88 X |
| 2,719,961 | 10/1955 | Karnaugh | 340—166 |
| 2,805,020 | 9/1957 | Lanning | 307—88 |
| 2,825,890 | 3/1958 | Ridler | 340—174 |
| 2,923,833 | 2/1960 | Lawrence | 307—88 |
| 2,935,627 | 4/1960 | Schneider | 340—172.5 X |
| 2,951,240 | 8/1960 | Bobech | 340—166 |
| 3,025,498 | 3/1962 | Blodgett | 340—172.5 |
| 3,085,232 | 4/1963 | Lomy | 307—88 X |
| 3,099,818 | 7/1963 | Murray | 340—172.5 |
| 3,181,121 | 4/1965 | Losch et al. | 340—172.5 |

PAUL J. HENON, *Primary Examiner.*

U.S. Cl. X.R.

307—88; 340—174